United States Patent [19]

Norcross et al.

[11] Patent Number: 5,036,882

[45] Date of Patent: Aug. 6, 1991

[54] VALVE ASSEMBLY FOR DECANTER FOR WASTEWATER TREATMENT FACILITY

[75] Inventors: Kenneth L. Norcross, Kansas City, Mo.; Dennis L. Nelson, Olathe, Kans.; Aaron D. Willis, Olathe, Kans.; James E. Augustyn, Olathe, Kans.

[73] Assignee: JMO Holding, Inc., Industrial Airport, Kans.

[21] Appl. No.: 560,133

[22] Filed: Jul. 31, 1990

[51] Int. Cl.⁵ .................... F16K 15/02; B01D 21/24
[52] U.S. Cl. ............................ 137/543.23; 137/543; 137/536; 210/117; 210/136
[58] Field of Search ........... 137/536, 540, 543, 543.21, 137/543.23; 210/117, 118, 119, 136

[56] References Cited

U.S. PATENT DOCUMENTS

| | | | |
|---|---|---|---|
| 2,055,601 | 9/1936 | Dodge | 137/543.23 X |
| 2,091,874 | 8/1937 | Nehaus | 251/333 X |
| 2,297,535 | 9/1942 | Bryant | 251/333 X |
| 2,619,115 | 11/1952 | Dondero et al. | 137/543 X |
| 3,460,805 | 8/1969 | Kudlaty | 210/136 X |
| 3,503,418 | 3/1970 | Petrucci et al. | 137/540 |
| 3,578,166 | 5/1971 | Paulus | 210/117 X |
| 4,368,755 | 1/1983 | King | 137/540 X |
| 4,464,265 | 8/1984 | Joyner | 210/517 |
| 4,478,243 | 10/1984 | King | 137/512.1 |
| 4,485,844 | 12/1984 | Vander Kaay et al. | 137/536 X |
| 4,515,179 | 5/1985 | Edmunds et al. | 137/536 X |
| 4,711,716 | 12/1987 | Calltharp et al. | 210/136 |

FOREIGN PATENT DOCUMENTS 2650934 5/1978 Fed. Rep. of Germany ...... 137/536

Primary Examiner—John Rivell
Attorney, Agent, or Firm—Litman, McMahon & Brown

[57] ABSTRACT

A pressure responsive valve assembly for use in a decanting apparatus for a wastewater treatment reactor. The valve assembly includes a cylindrical valve plate, a valve member support structure, a valve spring, and a valve member comprising a valve stem and a valve head. A discharge passageway extending through the valve plate has a frusto-conical valve seat located therein. The valve head also has a frusto-conical design having an angle of divergence smaller than that of the valve seat so that when the valve head is biased against the valve seat by the valve spring, the valve seat sealingly engages a peripheral edge of the valve seat. The valve member support structure maintains the valve member in proper alignment with the valve seat and in engaging relationship with the valve spring. The valve assembly is configured so as to reduce the ability of sludge to pass through the valve during mix cycles or to settle on the valve assembly during settling cycles of a wastewater treatment process thereby reducing the possibility that such sludge will subsequently be withdrawn from the reactor with decanted liquid during the decanting cycle.

7 Claims, 2 Drawing Sheets

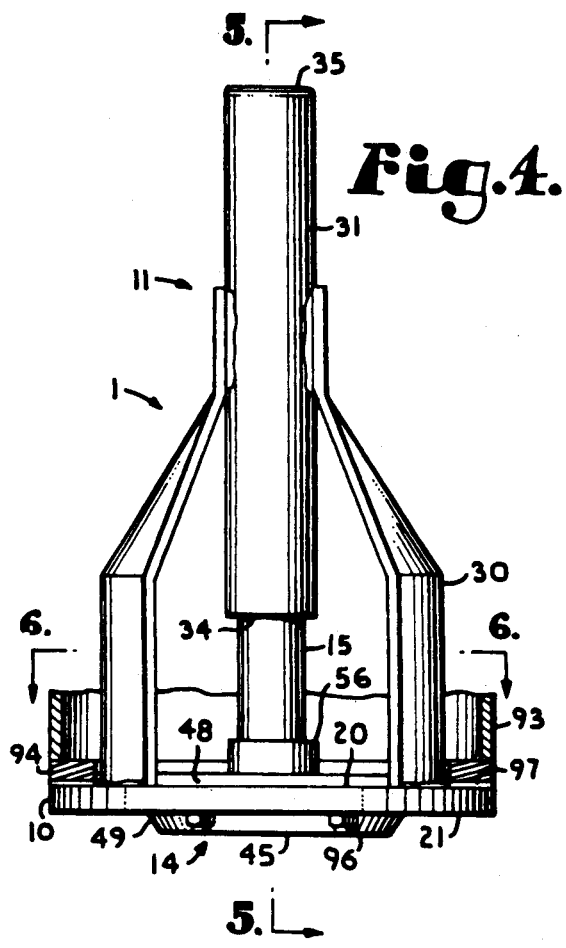
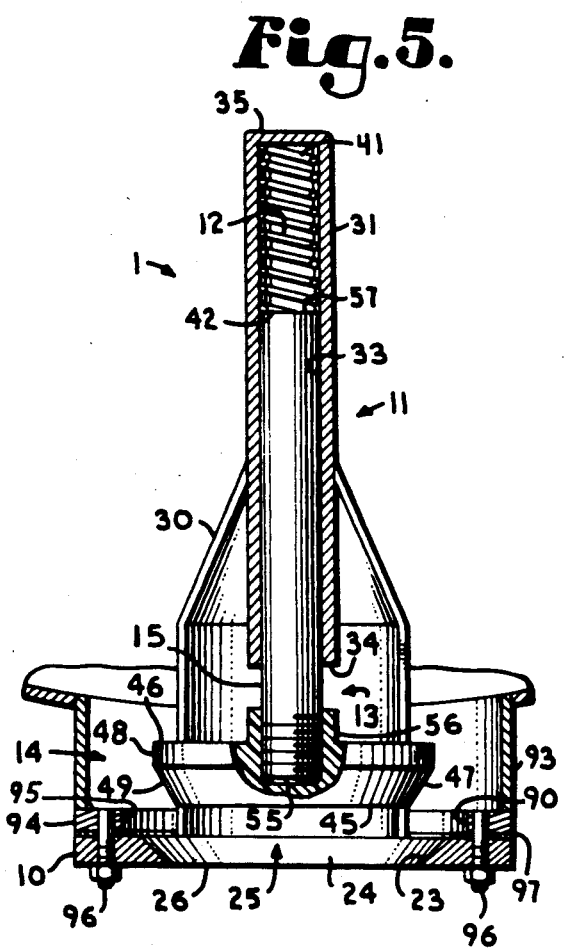
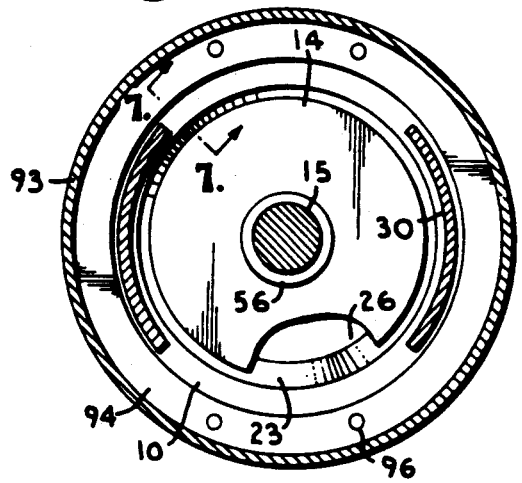
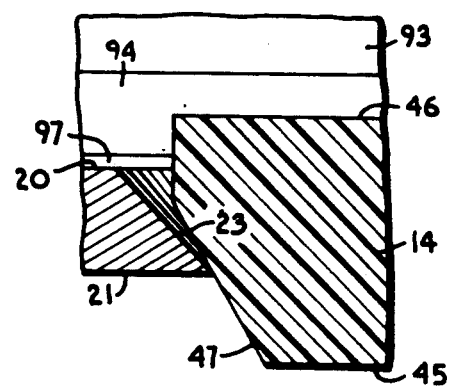

VALVE ASSEMBLY FOR DECANTER FOR WASTEWATER TREATMENT FACILITY

BACKGROUND OF THE INVENTION

The present invention relates generally to pressure responsive valve assemblies and in particular to such a valve assembly adapted for use in a decanting apparatus in a wastewater treatment facility.

Certain wastewater treatment processes, especially those utilizing sequential batch reactor techniques or processes, require that clarified fluid be periodically withdrawn from the reactor or digester within which the process is occurring. During certain cycles within the reactor, especially mix cycles, sludge is agitated with all of the fluid in the reactor in order to mix organic degrading bacteria with organic materials in the water being treated. It is important that the decanting system not allow the sludge to enter the decanter during the mix cycles or have sludge settle within the decanting system so that when the sludge is settled and clarified liquid is withdrawn from the reactor, no sludge is withdrawn with the clarified liquid. Sludge discharged with the clarified liquid causes substantial downstream pollution.

One of the major problems with certain prior art decanter systems for use in batch reactors has been that a receiver for the decanter has had the interior thereof open to fluid within the reactor during sludge mixing cycles. When the sludge is being mixed with the incoming effluent and the entire reactor is in a generally mixed state, sludge is near the top of the reactor as well as the bottom. If the receiver is open at this time, the sludge usually enters the receiver and settles therein during settling cycles. Thereafter, when the clarified fluid is withdrawn through the receiver, the sludge that is within the receiver is entrained with the clarified fluid to pollute the effluent.

Over the years, engineers have developed various devices to solve this problem. In one such device, an initial quantity of clarified effluent removed from the reactor during each decanting cycle is flushed back into the reactor so as to return the entrained sludge. However, such a solution requires a pump and control mechanisms which complicate the system and can easily fail leading to substantial downstream pollution.

Other attempts to resolve the problem of sludge settling within the receiver have been directed to physically removing the receiver from the tank during mixing cycles. This typically requires a cumbersome and expensive structure which is suitably strong to hold a decanting system out of the reactor fluid during the mix cycle. In addition, where freezing is likely to occur, fluid within the decanting structure may freeze if raised from the liquid in the reactor, or the fluid level at the top of the reactor may freeze which may make it difficult or impossible to raise and lower the decanting structure.

Finally, various types of pressure responsive valves or flaps have been placed in the openings to the decanting system to keep sludge out of the system when the contents of the reactor are being mixed. While such valves or flaps have reduced the sludge in the decanted fluid, none have been successful in keeping sludge sufficiently out of the effluent to satisfy many pollution control requirements, especially at relatively high wastewater flow rates. In particular, such prior art valves often have provided surfaces onto which the entrained sludge may settle during the settling cycles. Then during decanting cycles, the sludge becomes entrained in the clarified effluent withdrawn from the reactor through the receiver. In many pressure responsive valves, the structure forming the valve seat extends beyond the interface of the valve member with the valve seat. If such a valve were used in a decanting apparatus for a wastewater treatment reactor, the structure forming the valve seat would extend beyond the valve member into the reactor providing significant surface area for sludge to settle on during the settling cycles.

SUMMARY OF THE INVENTION

The present invention provides a pressure responsive valve assembly particularly well adapted for use in a decanting apparatus of a batch wastewater treatment system.

The valve assembly is adapted to prevent the inadvertent discharge of sludge with clarified water from the reactor during the decanting of the clarified water from the reactor by reducing the ability of sludge to be carried into or settle onto the valve assembly during the preceding settle period.

The valve assembly generally comprises a valve plate, a valve member and a valve member support structure. The valve plate is generally cylindrical, having an inner and an outer planar surface. An inner frusto-conical wall which diverges outward from the outer planar surface to the inner planar surface defines a valve seat and a discharge passageway through the valve plate. The valve seat includes a circular interface formed at the intersection of the outer planar surface and the inner frusto-conical wall.

The valve member has a valve head and a centrally and perpendicularly aligned valve stem. The valve head is also generally frusto-conical, having a peripheral edge diverging outward from a frontal circular surface to a rearward circular surface. The angle of divergence of the valve head is smaller than the angle of divergence of the valve seat and the valve head is sized proportionally to the valve seat, so when the valve head is biased against the valve seat the circular interface of the valve seat sealingly engages the peripheral edge of the valve head between the frontal and rearward circular surfaces.

The valve member support structure includes a pair of upstanding support members which maintain a valve stem receiving tube in a central, axially aligned, and spaced relation behind the discharge passageway of the valve plate. A coil spring is axially aligned within and at a distant end of the valve stem receiving tube. The valve stem is received within the valve stem receiving tube through an open, near end. The coil spring biases the valve stem outward towards the valve plate so that the valve head sealingly engages the valve seat.

The valve assembly is preferably securely mounted in ports in a clarified liquid receiver on the decanting apparatus so that the valve plate extends across the port and the valve assembly extends inside the receiver, so as to block flow into the receiver through a port when the respective valve assembly is in a closed position thereof. The differential pressure across the valve head between the reactor and the receiver is preferably controlled by a control valve downstream and in flow communication with the receiver. When the control valve is opened, the differential pressure across the valve head increases so as to compress the coil spring and advance the valve head away from the valve seat thereby allowing clarified wastewater to drain from the reactor. When the control valve is closed the differential pressure across the valve head is decreased so that the coil spring biases the valve head into sealing engagement with the valve seat.

OBJECTS OF THE INVENTION

Therefore, the objects of the invention are: to provide a pressure responsive valve assembly for use in conjunction with a decanting apparatus of a wastewater treatment reactor and system which is highly effective in preventing sludge from being drawn from the reactor with clarified or treated effluent during decanting cycles; to provide such a valve assembly which greatly reduces the ability of sludge to settle on the valve during a settling cycle of the reactor; to provide such a valve assembly which is opened and closed by pressure changes in the reactor system; to provide such a valve assembly which is relatively inexpensive, easy to install, and has a relatively long life expectancy. Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged and fragmentary cross-sectional view of the decanting apparatus showing one of the valve assemblies, taken generally along line 4—4 of FIG. 3 and showing the valve assembly in a closed position.

FIG. 5 is an enlarged and fragmentary cross-sectional view of the decanting apparatus and one of the valve assemblies, taken along line 5—5 of FIG. 4 with portions broken away to show interior detail thereof and showing the valve assembly in an open position.

FIG. 6 is an enlarged and fragmentary cross-sectional view of the decanting apparatus and one of the valve assemblies, taken along line 6—6 of FIG. 4.

FIG. 7 is an enlarged and fragmentary cross-sectional view of the decanting apparatus and one of the valve assemblies, taken along line 7—7 of FIG. 6.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
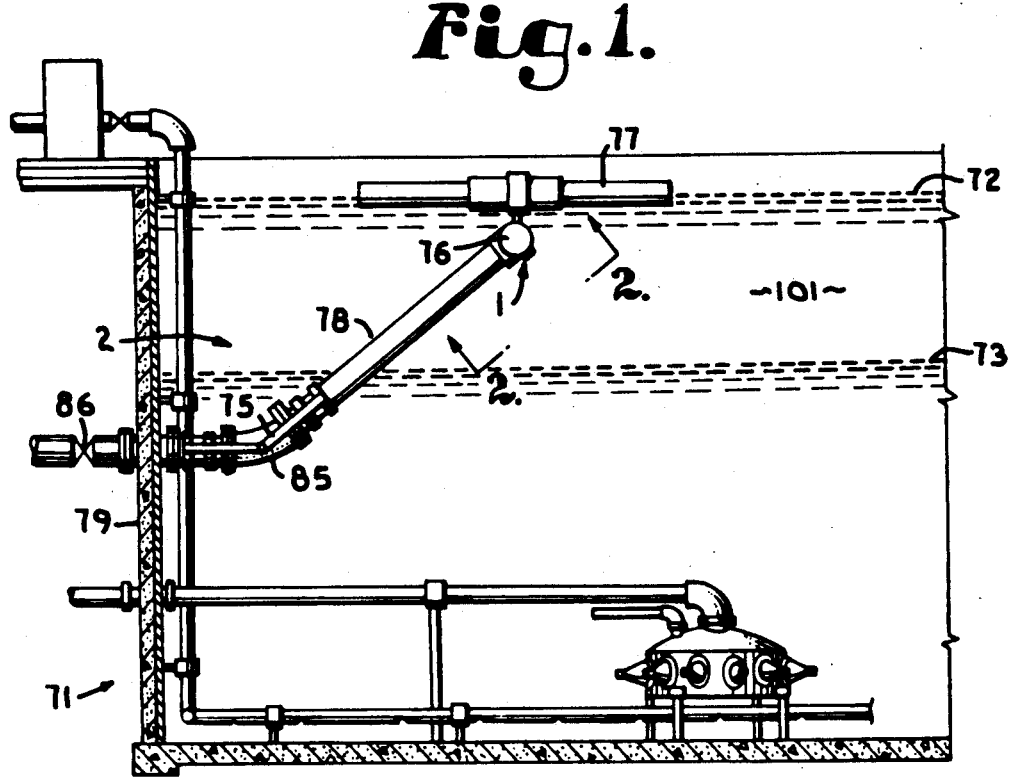
FIG. 1 is a partially schematic cross-sectional view of a wastewater treatment facility having a decanting apparatus including pressure responsive valve assemblies in accordance with the present invention.

Referring to the drawings in more detail, the reference numeral 1 generally represents a pressure responsive valve assembly of the present invention. A plurality of the valve assemblies 1 are spaced in a row in spaced relationship to one another in a decanting apparatus 2, as shown in FIG. 1. Each valve assembly 1, as shown in FIG. 5, generally comprises a valve plate 10, a valve member support structure 11, a coil spring 12, and a valve member 13, having a valve head 14 and a valve stem 15.

For purposes of locating various parts and as seen in FIGS. 4 and 5, the valve plate 10 is generally cylindrical or annular in shape having an inner, interior, or upper planar surface 20 and a generally parallel outer, exterior, or lower planar surface 21. A radially inward frusto-conical wall 23 which diverges outward from the lower planar surface 21 to the upper planar surface 20, forms or defines both a valve seat 24 and a discharge passageway 25 through the valve plate 10. (As used herein, the terms "upper" and "lower" are utilized for describing the parts relative to the drawings only and are not intended to be limiting). The valve seat 24 includes a circular interface 26 formed at the intersection of the lower planar surface 21 and the frusto-conical wall 23.

The valve member support structure 11 includes a pair of upstanding support members 30 and a valve stem receiving tube 31. The receiving tube 31 is generally cylindrical having an internal passageway 33, an open end 34 and a closed end 35. The upstanding support members 30 are secured to and extend away from the upper planar surface 20 of the valve plate 10 and are secured to the valve stem receiving tube 31 so as to space the valve stem receiving tube 31 away from the discharge passageway 25 in axial alignment therewith and perpendicular to the interface 26. The valve stem receiving tube 31 is centrally aligned with the discharge passageway 25 and positioned so that the open end 34 of the valve stem receiving tube 31 is closer to the discharge passageway 25 than the closed end 35, and the open end 34 is spaced away from the discharge passageway 25.

As shown in FIG. 5, the spring 12 is a compression type spring having a diameter slightly smaller than the diameter of the internal passageway 33 of the valve stem receiving tube 31 and is placed within the internal passageway 33 so that an abutting end 41 of the spring 12 abuts against the closed end 35 of the valve stem receiving tube 31 and an extending or opposite end 42 of the spring 12 extends along the internal passageway 33 towards the open end 34 of the valve stem receiving tube 31.

The valve stem 15 of the valve member 13 is generally cylindrical having a diameter slightly smaller than the diameter of the internal passageway 33 of the valve stem receiving tube 31 and equal to or larger than the diameter of the spring 12. The valve head 14 of the valve member 13 is generally frusto-conical, having a frontal circular surface 45 (lower surface in FIG. 5), a rearward circular surface 46 (upper surface in FIG. 5), and a circumferential surface 47 having an upper cylindrical section 48 and a lower frusto-conical section 49 diverging outward from the frontal circular surface 45 to the rearward circular surface 46.

A proximate end 55 of the valve stem 15 threadingly engages a threaded collar 56 axially and centrally mounted on the rearward circular surface 46 of the valve head 14 such that the valve stem 15 extends perpendicularly away from the rearward circular surface 46. A distal end 57 of the valve stem 15 is slidingly received within the valve stem receiving tube 31 and abuttingly engages the extending end 42 of the spring 12. The spring 12 thereby operably functions as biasing means and biases the valve stem 15 outward towards the valve seat 24 so that the valve head 14 sealingly engages the valve seat 24 at the circular interface 26 when in a closed position thereof, as shown in FIGS. 4 and 7.

The diameter of the circular interface 26 is greater than the diameter of the frontal circular surface 45 and smaller than the diameter of the rearward circular surface 46. Also, the angle of divergence of the frusto-conical surface 47 of the valve head 14 from the frontal circular surface 45 to the rearward circular surface 46 is smaller than the angle of divergence of the inner frusto-conical wall 23 from the lower planar surface 21 to the upper planar surface 20 so that when the valve head 14 is biased against the valve seat 24, the frontal circular surface 45 of the valve head 14 extends beyond the circular interface 26 and the frusto-conical surface 47 of the valve head 14 sealingly engages the valve seat 24 along the circular interface 26, as shown in FIG. 7.

When the differential pressure across the valve head 14 exceeds the biasing force of the spring 12, the valve head 14 is forced out of sealing engagement with the valve seat thereby compressing the spring 12 and opening the discharge passageway 25, so as to place the valve assembly 1 in an open configuration thereof as is seen in FIG. 5. Conversely, when the differential pressure across the valve head 14 drops below the biasing force of the spring 12, the spring 12 biases the valve head 14 into sealing engagement with the valve seat 24.

Although it is foreseen that the pressure responsive valve assembly 1 of the present invention may be used in a variety of applications, it is particularly well adapted for use with a decanting apparatus 2 such as that disclosed in FIG. 1. The decanting apparatus 2 is adapted for use in a wastewater batch reactor 71 to decant clarified wastewater from a high water level 72 to a low water level 73. The decanting apparatus 2 comprises support means, such as illustrated supporting structure 75, a clarified liquid receiver 76, flotation means, such as illustrated floats 77, and a discharge manifold 78. The discharge manifold 78 sealably passes through a sidewall 79 of the wastewater batch reactor 71 and empties into a municipal sewer, discharge stream or the like (not shown).

The discharge manifold 78, which includes a flexible segment 85, extends to and is in flow communication with the clarified liquid receiver 76. The floats 77 which are secured to the clarified liquid receiver 76 maintain the clarified liquid receiver 76 at a position normally one to two feet below the surface of the liquid in the wastewater batch reactor 71. The flexible segment 85 which is positioned below the low water level 73 allows the clarified liquid receiver 76 to rise and fall in correspondence to the liquid level in the wastewater batch reactor 71.

A control valve 86 is positioned along the discharge manifold 78 below the low water level 73. The valve 86 may be selectively activated to allow or prevent flow through the manifold 78.

The clarified liquid receiver 76 is an elongate tube centrally located relative to an end of the discharge manifold 78 and flow communicating internally therewith. The clarified liquid receiver 76 is generally horizontally positioned and remains horizontally aligned along its axis as it correspondingly rises and descends with the liquid level.

Figure 2:
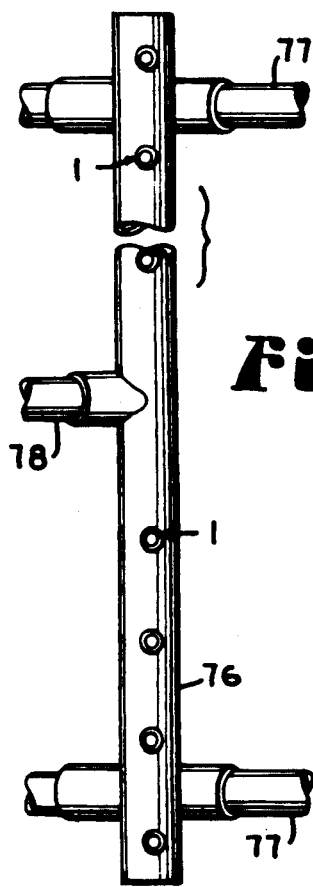
FIG. 2 is an enlarged and fragmentary view of the decanting apparatus, taken along line 2—2 of FIG. 1.
Figure 3:
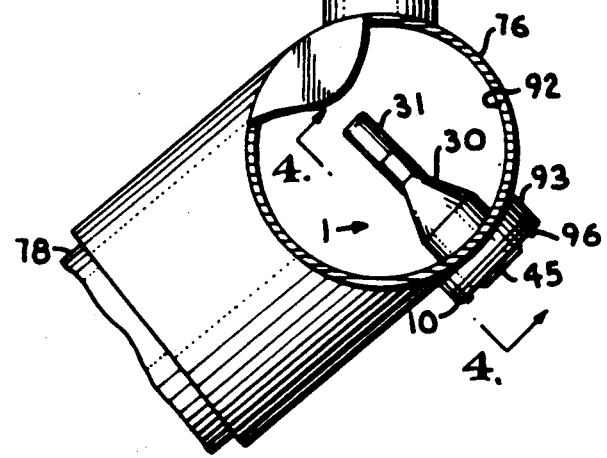
FIG. 3 is an enlarged and fragmentary front elevational view of the decanting apparatus, with portions broken away therefrom to show one of the valve assemblies.

Located at spaced locations along the receiver 76 near the lower side thereof are a plurality of openings, apertures or ports 90, as shown in FIG. 2. The ports 90 open into a central collecting chamber or cavity 92 of the receiver 76, as shown in FIG. 3. It is foreseen that other receiving configurations such as circular cross-shaped would function as the illustrated elongate tube receiver 76. A valve assembly 1 is located in each port 90. The valve assemblies 1 are preferably all positioned or aligned so as to face in a downwardly direction throughout the range of operation of the clarified liquid receiver 76 from the low water level 75 to the high water level 72. For example, at the low water level 73, the valve assemblies 1 are positioned so as to generally face directly downward. As the water level rises, the clarified liquid receiver 76 remains in fixed relation with the discharge manifold 78 so that, as the discharge manifold pivots in response to the rising fluid level, the downward positioning of the valve assemblies 1 correspondingly pivots, such that at the high water level 72, the valve assemblies 1 are positioned so that the axis of the valve stem 15 is angled approximately 45° relative to vertical and the frontal circular surface 45 of the valve head 14 as shown in FIG. 3.

A circular valve support member 93 extends downward from the clarified liquid receiver 76 along the outer edge of each port 90 so as to be in flow communication with the cavity 92. A circular flange 94 having a bore 95 therethrough is secured to each circular valve support member 93 at the end of the valve support member 93 spaced away from the clarified liquid receiver 76. The inner diameter of the bore 95 is smaller than the inner diameters of the ports 90 and the valve support members 93 and slightly greater than the diameter between the upstanding support members 30 of the valve member support structure 11. The valve plate 10 is secured to the circular flange 94 by a set of bolts 96 so that the valve plate 10 extends completely across the bore 95 and the valve member support structure 11 and the valve member 13 extend within the cavity 92 of the receiver 76 as shown in FIG. 3. A spacer or gasket 97 is positioned between the circular flange 94 and the valve plate 10.

The valve head 14 is constructed of a suitable elastomeric composition for sealing with the valve seat 24 which is constructed of metal such as stainless steel. A suitable elastomeric composition for the valve head 14 has been found to be a two-part polyurethane rubber that is moulded to form, such as is available in a 65A diameter from Dennis Chemical Company of St. Louis as a two component mixture under the names Denflex 9811-2 (polyurethane base) and Denflex 9800-T (isocyanate prepolymer).

In use, the wastewater batch reactor 71 is typically partially prefilled with fluid to the low water level 73. This fluid is generally from a previous usage of the reactor 71 and includes a substantial amount of activated sludge (not shown) in a layer settled on the bottom of the reactor 71. Additional wastewater to be treated is added to the reactor to bring the fluid level up to the high water level 72. Thereafter, the fluid is agitated and/or aerated in accordance with the desired sequential batch reactor treatment selected for such wastewater, after which all agitation of the liquid is stopped, so that the sludge therein may again settle to the bottom. During agitation, microorganisms in the sludge modify biological wastes in the reactor so as to effectively remove the waste from the water. After settling, a clarified liquid layer at the top of the reactor remains so as to extend at least between the low water level 73 and the high water level 72. During the agitation and settling steps, the control valve 86 is closed so that the differential pressure between the frontal circular surface 45 and the rearward circular surface 46 of the valve head is negligible so that the spring 12 maintains the valve head 14 in sealing engagement with the valve seat 24, thereby operably preventing fluid inside the reactor 71 from entering the cavity 92 of the receiver 76. The downward angled valve head 14 and the seating of the valve head 14 at the outer planar surface 21 of the valve plate 10 greatly reduces the ability of sludge to settle onto the valve assembly 1 during the settle stage and to later be drawn out of the reactor 71 with clarified effluent.

When it is desired to drain the clarified liquid layer 101, the control valve 86 is opened so that clarified fluid maintained in the discharge manifold 78 drains from the manifold 78 and the receiver 76. This produces a partial vacuum within the receiver 76 and a substantial differential pressure across the outer planar surface 20 and the inner planar surface 21 of the valve seat 24 separating the cavity 92 of the receiver 76 from the fluid in the reactor 71. The differential pressure causes the spring 12 to compress and the valve assembly 1 to open, allowing clarified fluid to flow through the valve assembly 1 into the receiver 76 and through the discharge manifold 78 to a predetermined discharge site. The control valve 86 is selectively maintained open by an operator, computer control or the like, until the clarified fluid is drained to the low water level 73, after which the control valve 86 is shut. The differential pressure across the valve head 14 again becomes negligible and the spring 12 biases the valve head 14 into sealing engagement with the valve seat 24.

It is to be understood that while certain forms of the present invention have been illustrated and described herein, it is not to be limited to the specific forms or arrangement of parts described and shown.

What is claimed and desired to be secured by Letters Patent is as follows:

1. In a combination with a clarified liquid decanter for a wastewater treatment facility, a pressure responsive valve assembly comprising:
   (a) a valve plate having an inner and an outer planar surface and an inner frusto-conical shaped wall diverging outward between said outer plane surface and said inner planar surface so as to form a valve seat and define a discharge passageway through said valve plate, and further having a circular interface edge at the intersection of said inner frusto-conical shaped wall and said outer planar surface; said circular interface edge being located so as to be adapted to engage liquid within said treatment facility prior to the liquid entering said decanter;
   (b) a valve member sealingly engaging said inner frusto-conical wall at said interface edge when in a closed position thereof, said valve member having a frontal circular surface, a rearward circular surface wider in diameter than said frontal circular surface and a radially outward diverging and frusto-conical shaped surface disposed between said frontal and said rearward circular surfaces such that an angle of divergence between said frontal circular surface and said rearward circular surface along said outwardly diverging frusto-conical peripheral edge is less than an angle of divergence between said outer planar surface and said inner planar surface along said inner frusto-conical wall whereby, upon sealing, said interface edge abuts and seals against said frusto-conical shaped surface between said frontal and said rearward circular surface;
   (c) biasing means urging said valve member toward said valve seat and having a biasing force such that when said biasing force exceeds the differential pressure exerted against said frontal circular surface of said valve member by liquid, said biasing means biases said valve member to a closed position thereof against said valve seat so that said valve member engages said circular interface edge of said valve seat along said frusto-conical shaped surface and so that a portion of said valve member including the frontal circular surface extends beyond said outer surface of said valve plate and when the differential pressure exerted against said frontal circular surface by liquid exceeds the biasing force said valve member opens to an open position thereof such that said valve member is positioned away from said valve seat allowing the passage of liquid through said discharge passageway;
   (d) a valve stem centrally secured to said rearward circular surface of said valve member so as to extend perpendicularly away from said rearward circular surface and having a distal end, said distal end abuttingly engaging said biasing means;
   (e) a valve stem receiving tube having an open end and a closed end; said tube open end slidingly receiving said distal end of said valve stem and maintaining said biasing means in a biasing relationship with respect to said valve stem; and
   (f) receiving tube support means maintaining said valve stem receiving tube in a centrally spaced relation with said valve member so that said valve stem receiving tube slidingly receives said valve stem.

2. The combination according to claim 1 wherein:
   (a) said biasing means biases against said valve member rearward circular surface.

3. A wastewater treatment facility including a decanter apparatus including at least one pressure responsive valve assembly for use in decanting liquid from the facility; the decanter apparatus having a fluid receiver having an interior chamber in flow communication with a clarified wastewater discharge means and an aperture for communicating between said interior chamber and clarified wastewater to be decanted, said valve assembly comprising:
   (a) a valve plate having an inner and an outer planar surface and an inner frusto-conical wall diverging outward from said outer planar surface to said inner planar surface so as to form a valve seat and define a discharge passageway through said valve plate; said valve plate having a circular interface at the intersection of said inner frusto-conical shaped wall and said outer planar surface; said inner planar surface securable to said fluid receiver so that said valve plate extends across said aperture and is aligned to face in a downwardly direction;

(b) a valve member adapted to sealingly engage said inner frusto-conical shaped wall; said valve member having a frontal circular surface, a rearward circular surface and a radially outward frusto-conical shaped surface disposed between said frontal and said rearward circular surfaces such that an angle of divergence between said frontal circular surface and said rearward circular surface along said frusto-conical shaped surface is less than an angle of divergence between said outer planar surface and said inner planar surface along said inner frusto-conical shaped wall;

(c) biasing means urging said valve member against said valve seat and having a biasing force such that when said biasing force exceeds a liquid differential pressure on opposite sides of said valve member exerted against said frontal circular surface of said valve member, said biasing means biases said valve member to a closed position thereof against said valve seat such that said valve member engages said first circular interface of said valve seat along said frusto-conical shaped surface; and, when a liquid differential pressure exerted against said frontal circular surface exceeds said biasing force, said valve member is urged away from said valve seat to an open position thereof, thereby allowing the passage of fluid through said discharge passageway, said aperture, said interior chamber of said fluid receiver and said wastewater discharge means;

(d) a valve stem centrally secured to said rearward circular surface of said valve member so as to extend perpendicularly away from said rearward circular surface and having a distal end, said distal end abuttingly engaging said biasing means;

(e) a valve stem receiving tube having an open end and a closed end; said tube open slidingly receiving said distal end of said valve stem and maintaining said biasing means in a biasing relationship with respect to said valve stem; and (f) receiving tube support means maintaining said valve stem receiving tube in a centrally spaced relation with said valve member so that said valve stem receiving tube slidingly receives said valve stem.

4. In combination with a clarified liquid decanter for a wastewater treatment facility, a pressure responsive valve assembly comprising:

(a) a valve plate having an inner and an outer planar surface and an inner frusto-conical shaped wall diverging outward between said outer planar surface and said inner planar surface so as to form a valve seat and define a discharge passageway through said valve plate, and further having a circular interface edge at the intersection of said inner frusto-conical shaped wall and said outer planar surface;

(b) a valve member sealingly engaging said inner conical wall when in a closed position thereof, said valve member having a frontal circular surface, a rearward circular surface and a radially outward diverging and frusto-conical shaped surface disposed between said frontal and said rearward circular surfaces such that an angle of divergence between said frontal circular surface and said rearward circular surface along said outwardly diverging frusto-conical peripheral edge is less than an angle of divergence between said outer planar surface and said inner planar surface along said inner frusto-conical wall;

(c) biasing means urging said valve member toward said valve seat and having a biasing force such that when said biasing force exceeds the differential pressure exerted against said frontal circular surface of said valve member by liquid, said biasing means biases said valve member to a closed position thereof against said valve seat so that said valve member engages said circular interface edge of said valve seat along said frusto-conical shaped surface and so that a portion of said valve member including the frontal circular surface extends beyond said outer surface of said valve plate and when the differential pressure exerted against said frontal circular surface by liquid exceeds the biasing force said valve member opens to an open position thereof such that said valve member is positioned away from said valve seat allowing the passage of liquid through said discharge passageway;

(d) a valve stem centrally secured to said rearward circular surface of said valve member so as to extend perpendicularly away from said rearward circular surface and having a distal end, said distal end abuttingly engaging said biasing means;

(e) a valve stem receiving tube having an open end and a closed end; said tube open end slidingly receiving said distal end of said valve stem and maintaining said biasing means in a biasing relationship with respect to said valve stem; and (f) receiving tube support means maintaining said valve stem receiving tube in a centrally spaced relation with said valve member so that said valve stem receiving tube slidingly receives said valve stem.

5. The valve assembly as described in claim 4 wherein said receiving tube support means comprises:

(a) a pair of angled support members securely attached to said inner planar surface on opposing sides of said discharge passageway at first ends thereof and attached to said valve stem receiving tube at second ends thereof.

6. The valve assembly as described in claim 4 wherein: (a) said valve member is constructed of an elastomeric composition.

7. The valve assembly as described in claim 4 wherein:

(a) said biasing means is a compression spring positioned coaxially on said distal end of said valve stem.

* * * * *